United States Patent [19]

Hehl

[11] 3,751,203

[45] Aug. 7, 1973

[54] APPARATUS FOR INJECTION MOLDING

[76] Inventor: Karl Hehl, Siedlung 183, Lossburg/Wurttemberg, Germany

[22] Filed: June 25, 1971

[21] Appl. No.: 156,856

[30] Foreign Application Priority Data
July 2, 1970    Germany.................. P 20 32 789.3

[52] U.S. Cl................. 425/190, 425/242, 425/450
[51] Int. Cl............................................. B29f 1/00
[58] Field of Search.................. 425/242, 450, 190, 425/192, 193

[56] References Cited
UNITED STATES PATENTS

| 3,373,459 | 3/1968 | Hehl | 425/450 X |
|---|---|---|---|
| 3,350,746 | 11/1967 | Blumer | 425/247 |
| 3,669,599 | 6/1972 | Snider et al. | 425/450 X |
| 3,564,658 | 2/1971 | Hehl | 425/188 |
| 2,490,625 | 12/1949 | Hall | 425/242 X |
| 2,575,190 | 11/1951 | Sedgwick | 425/242 X |
| 3,534,442 | 10/1970 | Mahle | 425/242 |
| 3,464,091 | 9/1969 | Bielfeldt | 425/246 |
| 3,674,400 | 7/1972 | Sauerbruch et al. | 425/242 X |

FOREIGN PATENTS OR APPLICATIONS

1,214,393   4/1966   Germany ......................... 425/242

Primary Examiner—J. Spencer Overholser
Assistant Examiner—David S. Safran
Attorney—Spencer & Kaye

[57] ABSTRACT

An injection molding apparatus including a clamping unit, a supporting frame and a driving device for pivoting the supporting frame and the clamping unit engaged therewith, wherein in one embodiment the supporting frame includes a clamping unit stabilizing arm and in another embodiment a part of the clamping unit is utilized as a stabilizing arm, and wherein in one embodiment the driving device is a hydraulic type actuator and in another embodiment the driving device is a manually actuatable spindle.

20 Claims, 14 Drawing Figures

Fig. 1

INVENTOR.
Karl Hehl

APPARATUS FOR INJECTION MOLDING

BACKGROUND OF THE INVENTION

The present invention relates to injection molding apparatus, and more particularly to an improvement of the injection molding apparatus described and claimed in my U.S. Pat. No. 3,564,658.

If in the device of the aforementioned patent the clamping unit is pivoted from the horizontal position to the vertical position, the center of gravity of the clamping unit, which in the horizontal position is located in the machine base, leaves the bottom area of the machine base. Because of system inertia, the clamping unit has the tendency to continue moving in the pivoting direction and to tip over. In the aforementioned patent, the tip over problem is prevented by joining the driving member of a pivoting device to the clamping unit at a distance from the pivot axis so that the driving member can hold the clamping unit in its vertical position. Since the point of juncture for the driving member of the pivoting device is disposed relatively close to the pivot axis of the clamping unit, substantial stresses may occur in the driving member at that point. Under certain circumstances a whipping phenomenon appears during pivoting of the clamping unit as well as when the unit is in the vertical position. For example, it was found that when the driving member of the pivoting device is suddenly stopped after pivoting of the clamping unit and this clamping unit is held in vertical position by fixing the supporting frame, 14 the relative large mass of the clamping unit may cause an oscillation of that unit, because the distance between the two fixing points for the frame is relative small.

It would, therefore, be desirable to provide a clamping unit which is stabilized to a substantial degree against the whipping phenomena exemplarily discussed above.

According to the present invention, the apparatus as disclosed and claimed in the aforementioned patent is now improved to such an extent that it now exhibits a greater stabilization of the clamping unit than has heretofore been feasible. This is accomplished by providing the clamping unit support with a stabilizing arm for stabilizing the vertically oriented clamping unit.

SUMMARY OF THE INVENTION

It is, therefore, an object of the present invention to provide an injection molding apparatus in which the clamping unit is stabilized to an extent not heretofore possible.

It is another object of the present invention to provide an injection molding apparatus in which a stabilizing arm formed as part of a clamping unit support is utilized to stabilize the clamping unit.

It is still another object of the present invention to provide an injection molding apparatus in which a stabilizing arm formed as part of the clamping unit is utilized to stabilize the clamping unit.

It is yet another object of the present invention to provide an injection molding apparatus in which a driving device is utilized to control the pivoting motion of the stabilizing arm and clamping unit.

These and other objects of the present invention are accomplished by provision of an injection molding apparatus including a clamping unit including a stationary member and a movable member, a supporting frame and a driving device. The supporting frame includes in one embodiment a stabilizing arm which serves to stabilize the clamping unit when the clamping unit is disposed in its vertical orientation. In another embodiment, the stabilizing arm is made integral with or attached directly to the clamping unit. In either embodiment the stabilizing arm is abutted at at least one point on the machine base, on which both the clamping unit and stabilizing arm are mounted for pivotal movement, at a distance from the pivot axis. With such a configuration the clamping unit is sufficiently stabilized in all operating positions. For example, in the vertical position, the clamping unit is supported over the entire length of the stabilizing arm or at the free end of this arm. In any case, there thus results a vertical fixation of the clamping unit by means of fixing points which are spaced relatively far apart from one another. This in particular relieves the driving device from the high stress loading of the clamping unit, so that the above-mentioned whipping phenomena is effectively eliminated.

Increased stabilization, particularly for heavier machines, is also provided according to the present invention in that in a machine of the above-mentioned type, the supporting frame or the stationary member is provided with a stabilizing arm which supports the movable member With this stabilizing arm the piston rods which bear the movable member are relieved of the weight of the movable member and the mold section carried thereby, particularly when the clamping unit is in the horizontal position.

Preferably, the stabilizing arm supporting the vertically oriented clamping unit simultaneously serves as the stabilizing arm and a supporting arm for the movable member.

Advantageously in one embodiment the supporting frame which comprises a frame structure includes a pivot portion and parallel or coaxial lever arms extending on either side of the pivot portion.

In another embodiment the supporting frame comprises a frame structure as above and a further pivot arm which branches off at an angle in the area of the pivot portion. The end of the latter pivot arm is in engagement with a pivot pin with a setting spindle axially mounted on the machine base.

In a further embodiment of the invention the supporting frame is designed as a two-armed toggle lever with one lever arm slidably mounting the stationary member and the other angled lever arm engaging by means of a pivot pin a setting spindle. The setting spindle is additionally mounted to the machine base through a pivot pin.

DESCRIPTION OF THE PREFERRED EMBODIMENTS

In all embodiments, the clamping unit 10 is mounted on the machine base 1 to be pivotal about an axis 11 of a pivot pin 3 through an angle of approximately 90°. At least one injection unit 91 (shown, for example, in FIG. 8) is coaxially connectable to the clamping unit 10 so as to operate transverse to the separating groove of the mold (not shown).

Figure 1:
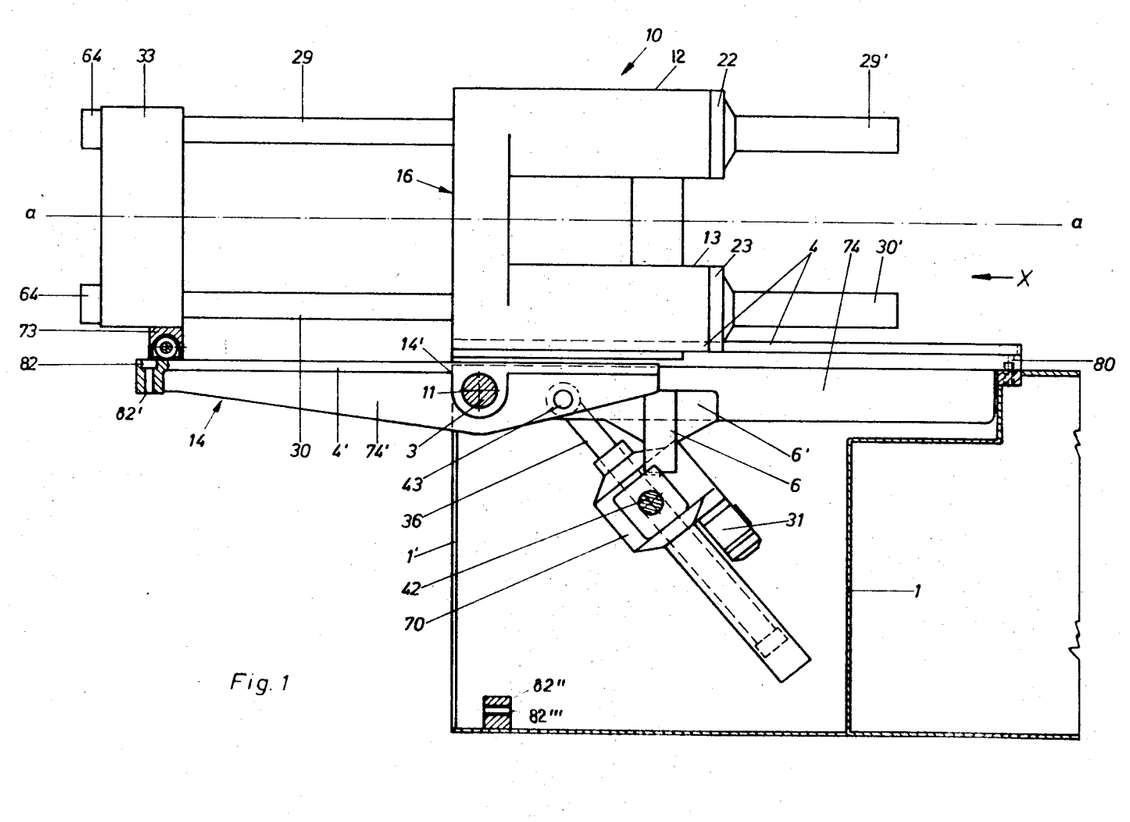
FIG. 1 is a side view of the apparatus, according to the invention, which shows a clamping unit and supporting frame horizontally disposed with a driving device for pivoting the clamping unit and supporting frame.
Figure 2:
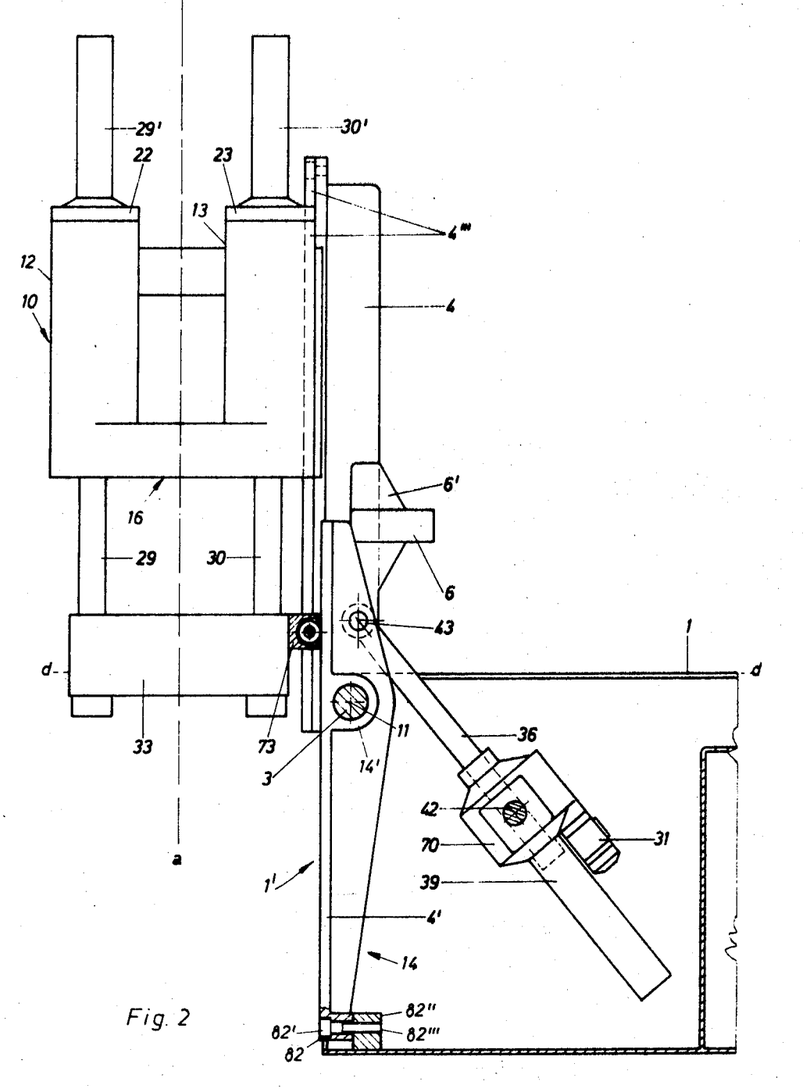
FIG. 2 is a side view of the apparatus of FIG. 1 showing the clamping unit and the supporting frame rotated 90°.

Referring to FIGS. 1 and 2, clamping unit 10 includes essentially a stationary member 16, a movable member 33 and two pairs of interconnecting piston rods 29 and 30. The stationary member 16 includes two pairs of pressure cylinders 12 and 13. These pressure cylinder 12 and 13 produce therein the closing pressure for the mold. Piston rod pairs 29 and 30 extend from the pressure cylinder pairs 12 and 13 outwardly thereof. At their end away from the pressure cylinders the piston rods extend through and are attached to the movable member 33 by means of bolts 64. The movable member 33 in turn has a pair of studs 73, whose purpose will be described hereinafter. The chambers of the pairs of pressure cylinders 12 and 13 are sealed at one end by means of two pairs of cylinder covers 22 and 23. The piston rods 29 and 30 extend through the covers 22 and 23 as sections 29' and 30'.

The supporting frame 14 in one embodiment (FIGS. 3 - 5 and 11 - 14) is configured as a two-armed lever. It includes three spaced transverse plates 71, 72 and 73 and parallel arms 74, 75 and 74', 75' extending from the ends of and between the transverse plates 71, 72 and 73. The transverse plates 71, 72 and 73 increase the structural stability of the supporting frame. The arms 74, 75 and 74', 75' include therein pairs of grooves or slide ways or guides 4, 5 and 4', 5' respectively.

Figures 3, 4, 5:
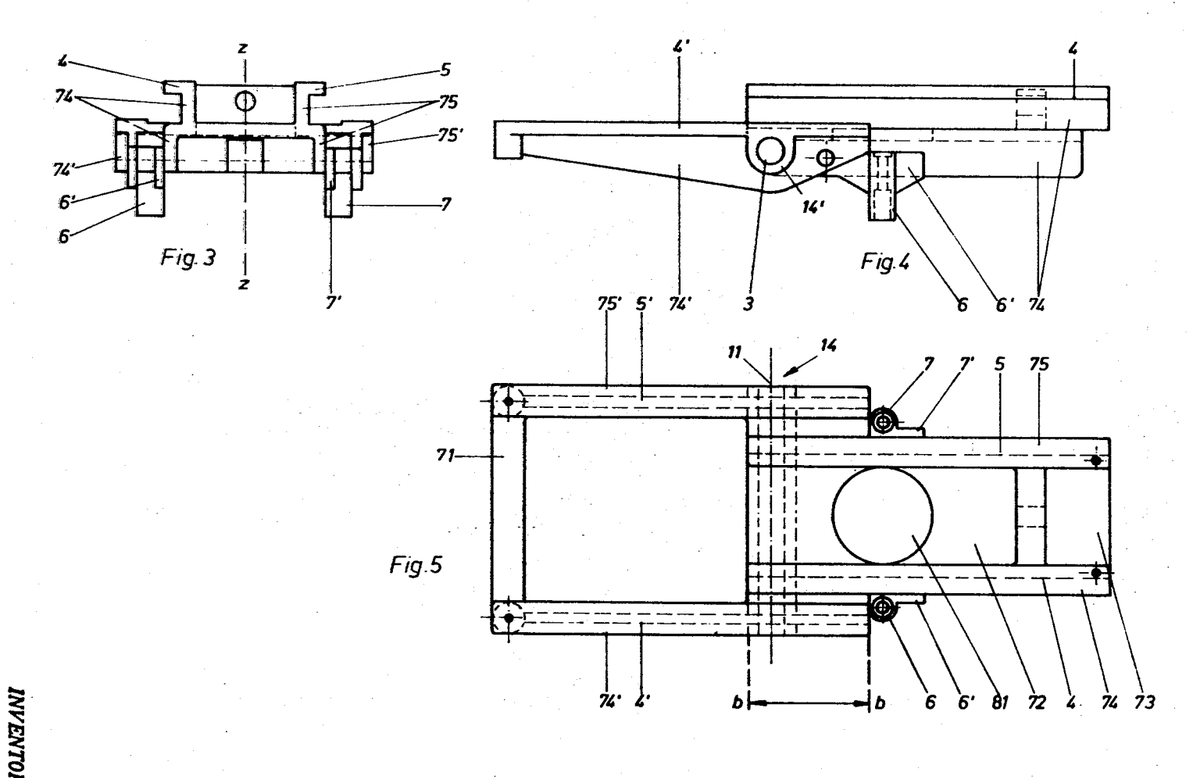
FIG. 3 is an end view of the supporting frame of FIGS. 1 and 2 viewed in the direction of FIG. 1.
FIG. 4 is a side view of the supporting frame of FIG. 1.
FIG. 5 is a plan view of the supporting frame of FIG. 1.

The pairs of grooves or slide ways or guides 4, 5 and 4', 5' overlap in the area b—b (FIG. 5). The overlap forms a plane which is disposed in the uppermost plane of the machine base 1. The stationary member 16 is mounted in the pair of grooves or guides 4, 5, with the lever arms 74' and 75' serving as stabilizing arms extending with their pair of grooves or slide ways 4', 5' from the pivot axis 11 in the direction of the movable member 33. The movable member 33 is displaceably mounted in the pair of grooves or slide ways 4', 5' with the aid of the studs 73. The studs are sliding on the plane surface of the sliding ways.

The pairs of grooves or slide ways or guides 4, 5 and 4', 5' may lie in different planes. For example, the pair of slide ways 4', 5' may be disposed at a greater distance from the axis a—a than is the pair of guides 4, 5, (FIG. 4). In some cases it may be advisable, however, to provide continuous guides which are disposed in one plane and to design the supporting frame 14 in such a manner that it is symmetrical with respect to a plane which passes through the pivot axis 11. That is, the plane of symmetry would be perpendicular to the plane of the pairs of guides and pass through axis 11.

It is not necessary that the studs 73 engage the pair of grooves 4', 5' on the stabilizing arms 74', 75'. These studs may, for example, simply slide on the surface of the stabilizing arms 74', 75'.

Sleeve-type connecting elements 6, 7, which have a preferably rectangular inner bore and reinforced plate-like protrusions 6', 7', serve for the connecting of an injection unit to the stationary member 16. These protrusions are attached to and extend from arms 74, 75 of the supporting frame 14. The supporting frame 14 has protruding therefrom two lugs 14' through which the pivot pin 3 extends for pivotally attaching the supporting frame 14 to the machine base 1 of the upper edge of the frontal side thereof.

The supporting frame 14 with its transverse plates 71, 72 and 73 may be made as one piece. Alternatively, instead of the supporting frame it is possible to use a closed mold piece which extends on both sides of the pivot axis 11 also in the form of a two-armed lever. That is, the stationary member 16 could be pivotally connected directly to the machine base 1.

The clamping unit 10 is axially displaceable along the pairs of grooves of the supporting frame by means of a setting spindle (not shown).

Further injection units (not shown) which cooperate with the separating groove of the mold as described in the afore - mentioned patent, may be guided with the aid of a carriage on stationary member 16 in a direction which extends parallel to the centerline a—a of the clamping unit 10. The carriage is joined with sleeves 6, 7. In this way it is possible to set the injection units for operation with the separating groove of the mold. Since the injection unit connected in sleeves 6, 7 cannot be adjusted in height, the separating groove is brought into coincidence with the injection axis of the injection unit by axial displacement of the vertically oriented clamping unit 10 (FIG. 2).

To pivot the clamping unit 10, actuators 70 are provided which are connected with the machine base 1 by a pivot pin 42, so that the actuators are held inclined to the vertical axis of the machine base 1. The actuators comprise a threaded spindle 36 which may be joined to the supporting frame 14 in the region b—b and a hydraulic motor 31. The threaded spindles are driven to extend in an axial direction by means of the hydraulic motors 31, which are in turn actuated in any conventional manner. The threaded spindles are preferably driven by a pinion (not shown) engageable therewith. It should be understood, however, that other driving relationships could be utilized to effect the axial extension of the spindles as desired. The actuators 70 each include a protective sleeve 39 into which the spindles 36 extend.

The plate-shaped connecting bar 72 between longitudinal arms 74, 75 is provided with a cut-out 81 for receiving therethrough the cylinder of an injection unit 10 held in the connecting sleeves 6, 7. All the free ends of lever arms 74' and 75' and abutment means 82 are provided for engaging a stop means 82'' mounted on the machine base 1. The engagement of the abutment means 82 and stop means 82'' serves to provide a load path through the lever arms 74' and 75' to the machine base 1, thereby substantially unloading the actuators 70 and thereby significantly improving the stability of the apparatus when the clamping unit 10 is vertically oriented. Additionally, the abutment means 82 and the stop means 82'' are provided with aligning bores 82' and 82''' respectively, for receiving a fastening bolt (not shown) if desired to insure a better engagement of the abutment and stop means.

Figure 6:
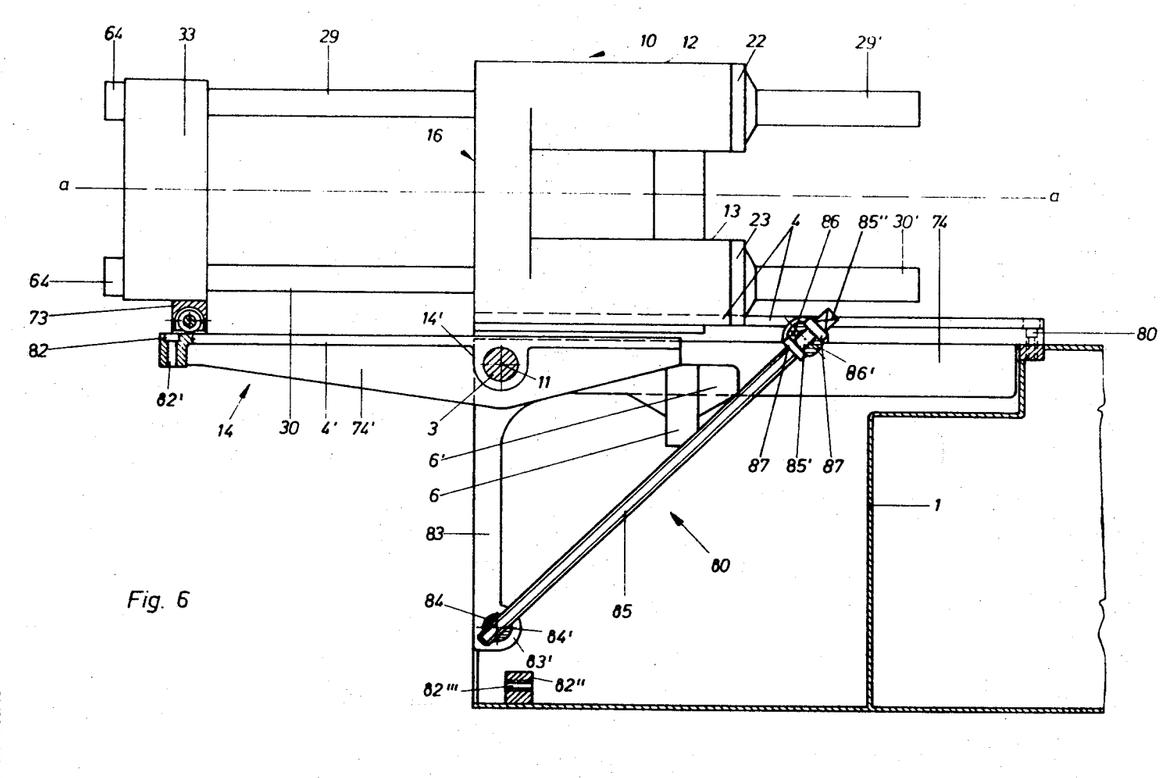
FIG. 6 is a side view of the apparatus of FIG. 1, with an alternate device for pivoting the clamping unit and supporting frame.
Figure 7:
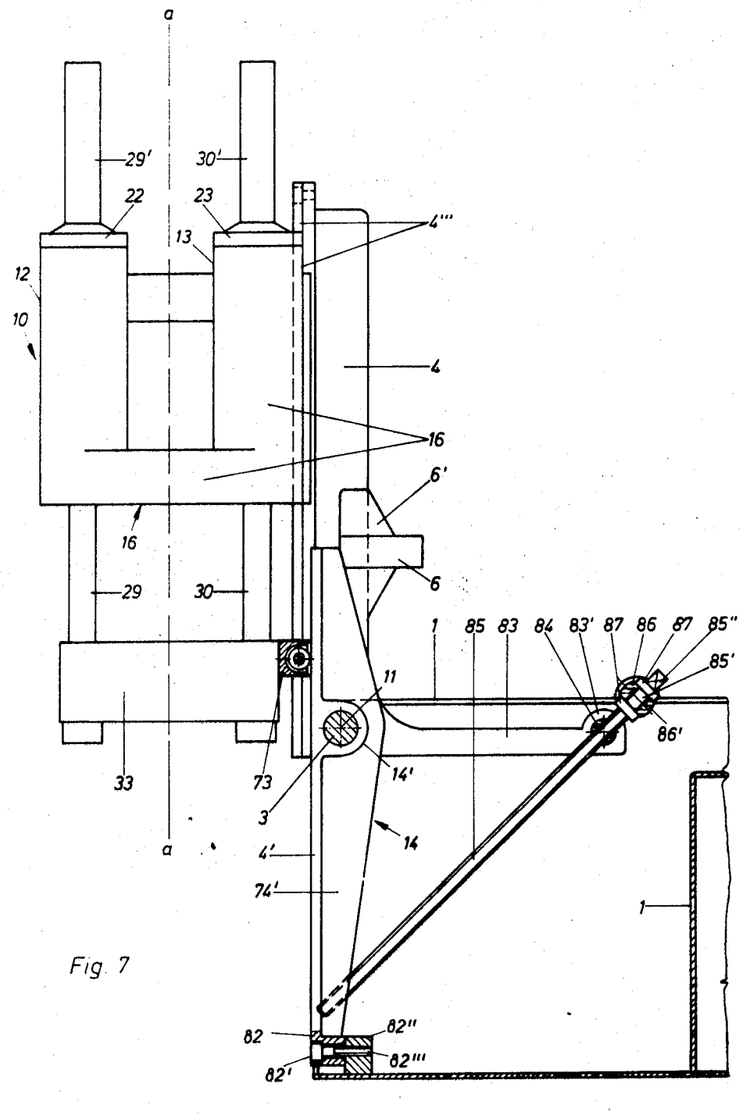
FIG. 7 is a side view of the apparatus of FIG. 2, with the alternate device for pivoting the clamping unit and supporting frame shown in FIG. 6.

Turning to the embodiment shown in FIGS. 6 and 7, it can be seen that instead of the actuators 70, a driving device 80 is provided which permits manual pivoting of the clamping unit 10. The device 80 comprises a pivot arm 83 which is connected to the supporting frame 14 by the pivot pin 3 and extends perpendicularly therefrom. The free end of the pivot arm 83 has pivotally mounted within a bore 83' a pivot pin 84. The pin 84 is provided with a threaded bore 84' into which one end of a setting spindle 85 is received. The setting spindle 85 is disposed in threaded engagement with the inner threads of the pin bore 84'. The other end 85' of the setting spindle 85 passes through a pivot pin 86 which is pivotally mounted within the machine base 1. The pivot pin 86 includes a bore 86' for receiving end 85' of the setting spindle 85. The adjustment of the setting spindle 85 is accomplished by means of the axial abutments 87 which are in contact with both sides of the pivot pin 86 and the square end 85'' of the setting spindle 85 which serves as an engagement surface of a pivot lever (not shown). The pivot lever could, for example, engage the square end 85'' and rotate the setting spindle 85 by either rotating the lever or by swinging the lever through respective arcs. As a result, the pivot arm 83 will advance axially along the setting spindle 85. Because the setting spindle 85 is connected to bearing bolt 86 it can pivot therewith so that the pivot arm 83 will be permitted to follow its natural arc in pivoting about axis 11 while axially advancing along setting spindle 85. Of course at any given axial position, the pivot arm 83 is held fast by the thread engagement of the bore 84' and the setting spindle 85. The abutment and stop means are similar to that shown and explained with respect to the embodiment of FIGS. 1 and 2.

Figures 8, 9:
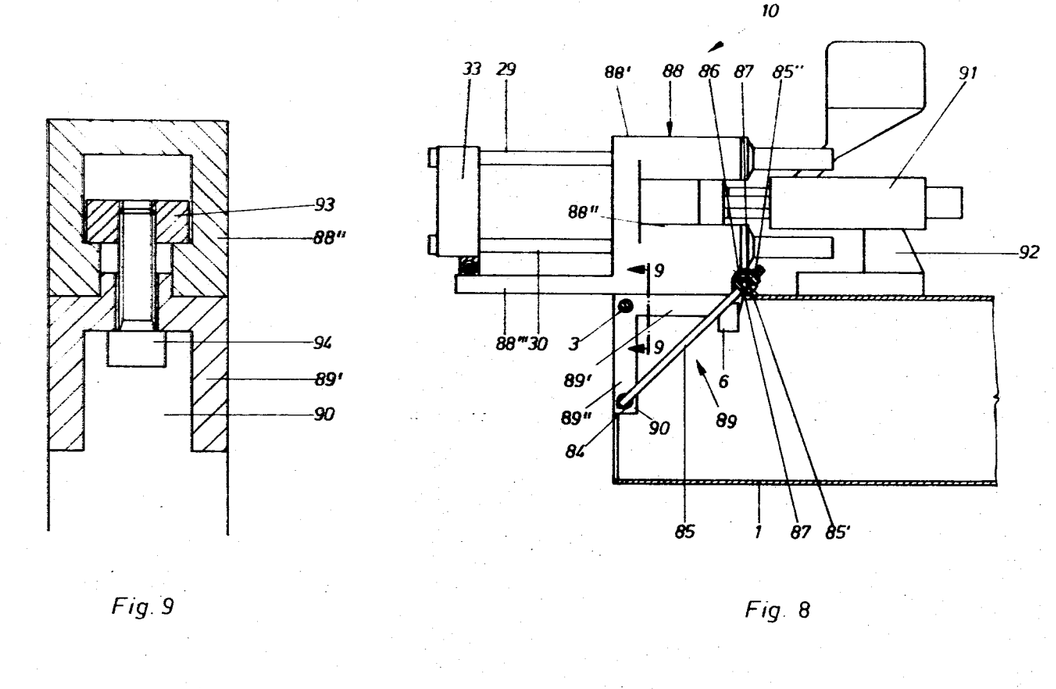
FIG. 8 is a side view of the apparatus, according to the invention, which shows a clamping unit and an alternate embodiment of the supporting frame along with the device for pivoting the clamping unit and the supporting frame shown in FIGS. 6 and 7.
FIG. 9 is a partial cross-sectional view taken along line 9—9 of FIG. 8 showing means for fastening the clamping unit to the supporting frame.
Figure 10:
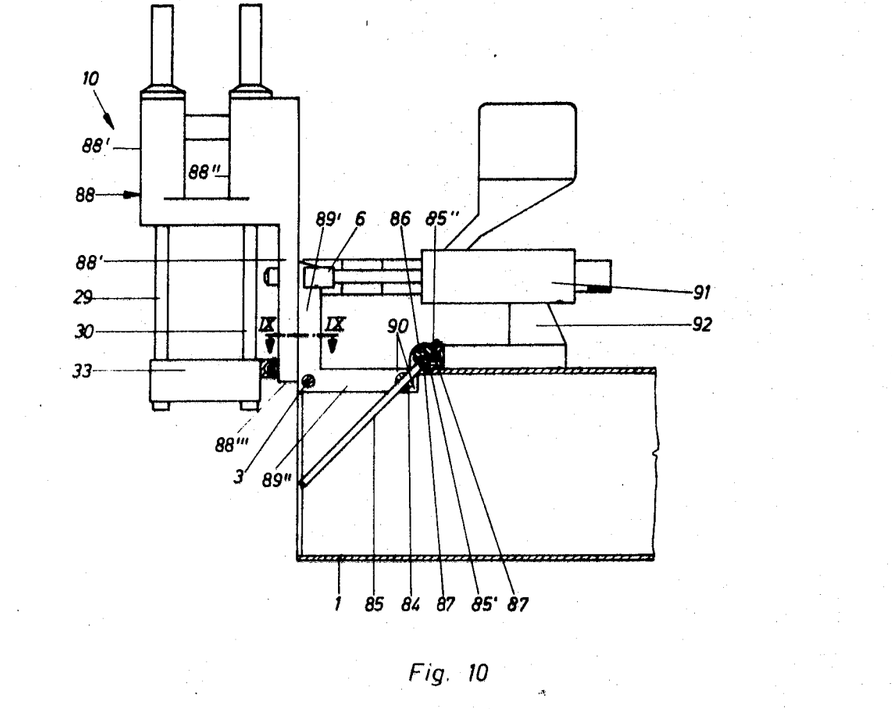
FIG. 10 is a side view of the apparatus of FIG. 8 showing the clamping unit and the supporting frame rotated 90°.

In still another embodiment shown in FIGS. 8 - 10, a two-armed toggle lever 89 is utilized. The toggle lever 89 includes two levers 89' and 89''. A supporting frame 88 which includes cylinder blocks 88', 88'' and stabilizing arms 88''' is guided on lever arm 89' (FIG. 9). The stabilizing arms 88''', which support the movable member 33, is preferably an integral component of the cylinder blocks 88''. However, it should be understood, that the arms 88''' may also be formed by one or a plurality of supporting struts which are fastened to the cylinder blocks. The other arm 89'' of the toggle lever 89 is perpendicular to arm 89' and serves as a stabilizing arm. The stabilizing arm 89'' also serves as a pivot lever and is part of a device for pivoting the clamping unit 10 which corresponds to that shown in the embodiment according to FIGS. 6 and 7. When the clamping unit 10 is in the vertical position, the free end 90 of the arm 89'' engages an abutment on the machine base 1 (FIG. 10).

When the clamping unit 10 is to transform from the horizontal position (FIG.8) to the vertical position (FIG. 10), first is to perform the pivoting about the axis 3 and then the cylinderblock 88'' is to move in axial direction until the position line of the mould lies in the axis of the injection unit 91 which works into this position line.

An exchangeable injection unit 91 may be connected coaxially to the clamping unit 10 (FIG. 8). In addition, it may be held in rectangular operating position, by the connecting sleeves 6 of the pivotal mold piece 89, 90. In both cases the injection unit is supported by a base 92. FIG. 9 shows how the cylinder block 88'' is guided in the area of its stabilization arm 88''' by the arm 89' of the toggle lever 89. It can particularly be seen how the stabilizing arm 88''' and thus the clamping unit 10 can be clamped to the arm 89' of the toggle lever in a certain axial position by means of screw bolts 94 and abutment elements 93.

Figure 11:
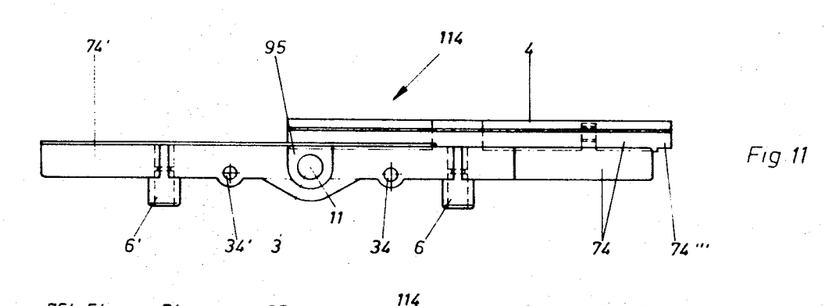
FIG. 11 is a side view of an alternate embodiment of the supporting frame.
Figure 12:
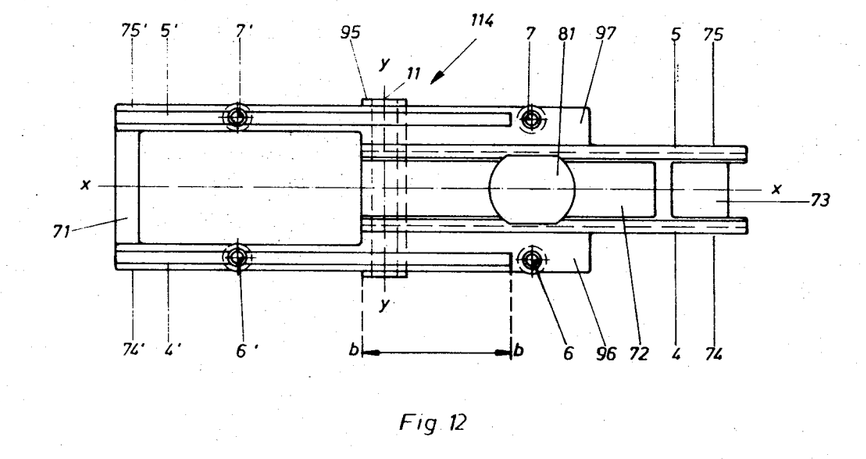
FIG. 12 is a plan view of the supporting frame of FIG. 11.
Figure 13:
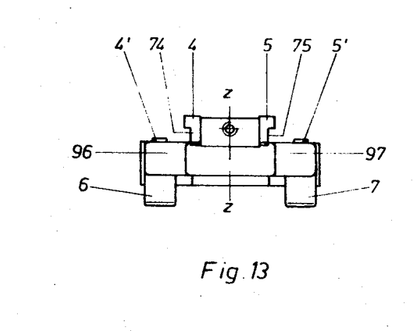
FIG. 13 is an end view of the supporting frame of FIGS. 11 and 12.

Turning now to FIGS. 11 - 12 there can be seen a supporting frame 114 which is a modified embodiment of supporting frame 14. Supporting frame 114 is provided, in addition to the connecting members 6, 7 with a further pair of connecting members 6'', 7'' for connecting an injection unit operating into the separating groove of a mold. The injection unit is fastened to the arms 74'75' of supporting frame 114 by the connecting members 6'', 7''. Both pairs 6, 7, 6'', 7'' of connecting elements are disposed symmetrically to the pivot axis 11. Two pairs of eyes 34, 34' are provided in the arms 74, 75 and 74', 75' respectively for connecting the actuators or devices shown in FIGS. 1 and 2 or 6, 7, 8 and 10 respectively.

Figure 14:
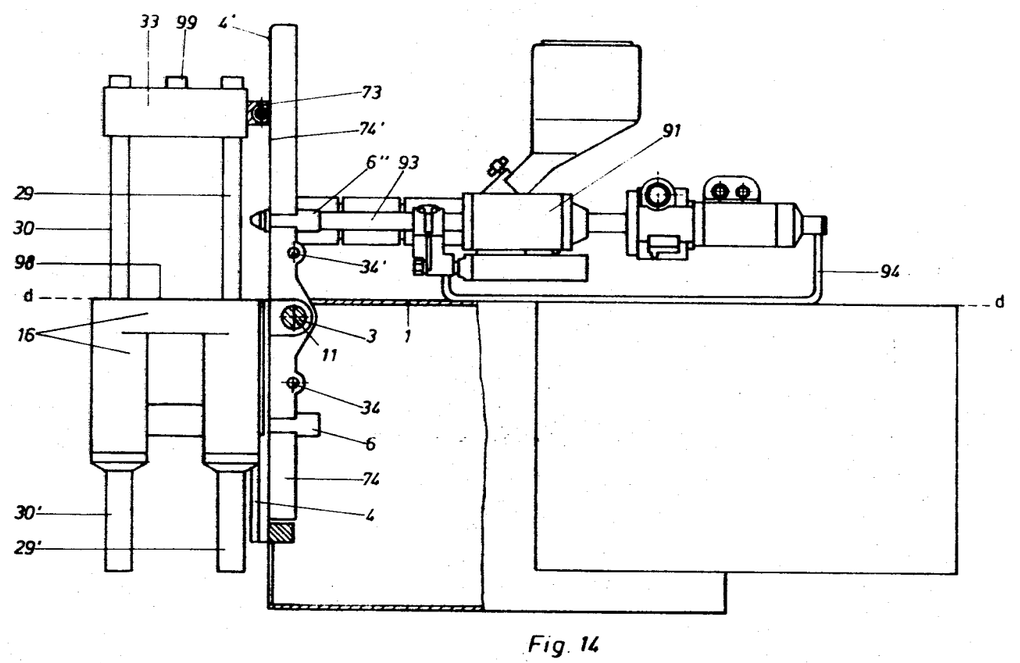
FIG. 14 is a side view of the apparatus, according to the invention, showing the supporting frame of FIGS. 11–13 and a clamping unit vertically disposed but without the device for pivoting the clamping unit and supporting frame.

It is sometimes advisable, in order to increase the versatility of an injection molding apparatus to be able to invert the position of the clamping unit 10 from that shown in FIG. 2 to that shown in FIG. 14. With a position of the clamping unit 10 according to FIG. 14 it is very easy, for example, to place insert portions or cores onto the immovable frontal face 98 of the stationary member 16 or on the mold half fastened to this frontal face without incurring the danger of a change in position due to shock. This is not the case in a position of the clamping unit as shown in FIG. 2, because the cores, which are subjected the effect of gravity cannot be positioned on the stationary member 16. Moreover, the center of gravity of the entire assembly is lower for a position of the clamping unit 10 according to FIG. 14 than for a position of the clamping unit 10 according to FIG. 2. This gives rise to a better stabilization of the entire assembly.

The clamping unit 10 together with the supporting frame 14 can be pivoted by 180° about an axis z—z so that the pair of grooves 4, 5 which are disposed above the line d—d of the machine base 1 when the clamping unit is in the vertical position will then lie below the line $d-d$. Such a position is shown in FIG. 14. The pivoting can be achieved by pulling the pivot pin 3 out from lugs 14′, and lifting the clamping unit 10 and the supporting frame 14 by a lifting device and pivoting them about axis $z-z$. The pivoted clamping unit and supporting frame are then replaced on the machine base in such a manner that the pivot pin 3 can again be placed through the lugs 14′. The orientation now has the clamping unit at the bottom and the movable member at the top such as is shown in FIG. 14.

If the supporting frame 114 is so designed, however, so that it is symmetrical about axes $x-x$ and $y-y$ in FIG. 12 at least insofar as having two sets of connecting members and identical pairs of grooves, then it will not be necessary to pivot the supporting frame 114 in order to bring the clamping unit 10 from a position according to FIG. 2 into a position according to FIG. 14 since the portions 74, 75, and 4, 5 disposed on the one side of the pivot axis 11 are identical with the portion 74′, 75′ and 4′, 5′ disposed on the other side of the pivot axis. In this way, the stationary member of the clamping unit 10 may be selectively mounted in the pair of grooves 4, 5 of the arms 74, 75 or in the pair of grooves 4′, 5′ disposed in extension of the pair of grooves 4, 5.

With such a configuration of the supporting frame 114 its length is desirably so dimensioned that the clamping unit 10 can be displaceable into a position in which its center of gravity lies above the base area of the machine base 1.

Advantageously the movable member 33 is provided with connecting elements 99 for the connection of a further injection unit in a direction coaxial with the clamping unit so that it is possible, when the clamping unit is in a position as shown in FIG. 14, to inject into the mold also in a direction transverse to the separating groove.

In the embodiment shown in FIG. 14, the supporting frame 114 is provided with eyes 34, 34′ as described above, so that actuators or other devices may be attached for pivoting the clamping unit 10 and pivotal mold piece 114 about axis 11.

It will be understood that the above description of the present invention is susceptible to various modifications, changes and adaptations, and the same are intended to be comprehended within the meaning and range of equivalents of the appended claims.

I claim:

1. Apparatus for injection molding, comprising in combination:
   a. a base;
   b. a mold clamping unit including a stationary member, a movable member and means connecting said members;
   c. support means for carrying said members and securing them to said base, said support means including
      1. a pivot portion for connecting said support means to said base for pivotal movement relative thereto about an axis thereof;
      2. parallel side members extending from said pivot portion on either side thereof, said side members including means for abutting said base at least at one point spaced from said axis; that portion of each side member that is disposed on one side of said pivot portion constitutes a stabilizing arm supporting said movable member;
      3. guide means provided on and along said members, said guide means including grooves; said stationary member engaging said grooves on one side of said pivot portion; said movable member slidably engaging said grooves on the other side of said pivot portion; said support means being symmetrical on both sides of said pivot portion with respect to said grooves, so that said stationary member is engageable with side members on either side of said pivot portion;
   d. drive means connected to said base and said supporting means for pivoting said supporting means about said axis in one direction so that said means for abutting engages said base at said at least one point; and
   e. two pairs of connecting means on each side of said pivot portion for the connection of said drive means in the two possible positions of said stationary member; said two pairs of connecting means forming part of said support means.

2. Apparatus for injection molding, comprising in combination:
   a. a base having an outline obtained by vertical projection;
   b. a mold clamping unit including a stationary member, a movable member and means connecting said members;
   c. pivot means attached to said base;
   d. arm means swingable about said pivot means in a substantially vertical plane to selectively assume a first, or substantially horizontal position and a second position disposed at least about 90° with respect to said first position, said arm means having
      1. a first element, at least a major part of which extending from said pivot means in a first direction; said major part being located over and within said outline in said first position of said arm means; said first element carrying said stationary member;
      2. a second element, constituting a stabilizing arm, at least a major part of which extending from said pivot means in a second direction that is opposite to said first direction; said major part of said second element being located externally of said outline in said first position of said arm means; said movable member supported by and travelling along said second element during operation of said apparatus;
   e. guide means provided on said second element of said arm means to cooperate with said movable member for guiding the latter in its travel; and
   f. abutment means on said major part of said second element to engage said base in said second position of said arm means.

3. An injection molding apparatus as defined in claim 2, further comprising means for adjustably immobilizing said stationary member along said first portions of said arm means.

4. An injection molding apparatus as defined in claim 2, wherein said arm means are formed of a plurality of parallel spaced arms.

5. An apparatus for injection molding as defined in claim 2, wherein said stabilizing arm is part of said stationary member.

6. An injection molding apparatus as defined in claim 5, further comprising a toggle lever having a pivot portion and two arms; said pivot portion consituting said pivot means; one arm of said toggle lever constituting said first element of said arm means; the other arm of said toggle lever constituting an additional stabilizing arm disposed substantially normal to said second element of said arm means, said additional stabilizing arm, when said clamping unit is vertically oriented with respect to said base, abuts with a free end thereof a portion of said base.

7. An injection molding apparatus as defined in claim 6 wherein an adjusting spindle engages said other arm of said toggle lever and said base, said other arm and said base including separate pivot pins for engaging an adjusting spindle, said adjusting spindle is inclined when engaged with said pins at an angle relative to the vertical axis of said base.

8. An injection molding apparatus as defined in claim 7, wherein said separate pivot pins are disposed approximately at the same distance from said pivot means.

9. An injection molding apparatus as defined in claim 2, wherein said arms means further comprises a pivot arm which branches off at an angle in the area of the pivot means, said pivot arm including means at its free end for engaging one end of a setting spindle, the other end of said setting spindle including means for engaging said base, both of said means for engaging adapted so that actuation of said spindle means causes said arm means to pivot at said pivot means.

10. An injection molding apparatus as defined in claim 9 wherein the free end of said pivot arm and the base both include pivot pins for engaging said threaded spindle.

11. An injection molding apparatus as defined in claim 2, wherein the movable member includes engaging means provided with guide rollers moving on hardened guide rails fastened to said second element of said arm means, said guide rails constituting said guide means.

12. Apparatus for injection molding, comprising in combination:
a. a base;
b. a mold clamping unit including a stationary member, a movable member and means connecting said members;
c. support means for carrying said members and securing them to said base, said support means incuding
 1. a pivot portion for connecting said support means to said base for pivotal movement relative thereto about an axis thereof;
 2. parallel side members extending from said pivot portion on either side thereof, said side members including means for abutting said base at least at one point spaced from said axis; that portion of each side member that is disposed on one side of said pivot portion constitutes a stabilizing arm supporting said movable member;
 3. guide means provided on and along said side members, said guide means including grooves; said stationary member engaging said grooves on one side of said pivot portion; said movable member slidably engaging said grooves on the other side of said pivot portion; and
d. means for longitudinally adjustably immobilizing said stationary member on said side members.

13. An injection molding apparatus as defined in claim 12, wherein the parallel side members engaging the stationary member extend from said pivot portion in the direction toward an injection unit coaxially connected with said stationary member, and the parallel side members engaging the movable member extend from said pivot portion in the direction away from the injection unit.

14. An injection molding apparatus as defined in claim 12, wherein the grooves in the parallel side members which engage the stationary member are formed by angled extensions of the side members.

15. An injection molding apparatus as defined in claim 12, wherein the guide grooves of each pair of parallel side members are adapted so that said stationary member is engageable with either pair of side members.

16. An injection molding apparatus as defined in claim 15, wherein the supporting means is symmetrical on both sides of said pivot portion with respect to said guide grooves.

17. An injection molding apparatus as defined in claim 16 including a pivot pin connecting said pivot portion to said base, said pivot pin can be withdrawn from its connection with the base so that the supporting frame can be rotated through 180° and then reinserted to connect the supporting frame to the base.

18. An injection molding apparatus as defined in claim 16, wherein said support means further includes two pairs of connecting elements one on each side of said pivot portion for connection of an injection unit operating into the separating groove of a mold supported by said clamping unit in both possible positions of said stationary member.

19. An injection molding apparatus as defined in claim 12, wherein said support means is formed by a frame structure.

20. Apparatus for injection molding, comprising in combination:
a. a base;
b. a mold clamping unit including a stationary member and a movable member and means connecting said members;
c. means for supporting said members so that said movable member can be disposed relative to said stationary member;
d. means for connecting said supporting means to said base for pivotal movement relative thereto about an axis thereof;
e. stabilizing means connected to said supporting means for stabilizing said clamping unit, said stabilizing means including means for abutting said base at at least one point which is disposed at a distance from said axis; and
f. drive means connected to said base and said supporting means for pivoting said supporting means about an axis in one direction so that said means for abutting engages said base at said at least one point; said drive means including actuator means mounted on said base at an inclined angle relative to the vertical axis of said base; said actuator means having a threaded spindle and a hydraulic motor drivingly connected to said threaded spindle.

* * * * *